United States Patent [19]

Zamora

[11] Patent Number: 5,448,474
[45] Date of Patent: Sep. 5, 1995

[54] METHOD FOR ISOLATION OF CHINESE WORDS FROM CONNECTED CHINESE TEXT

[75] Inventor: Antonio Zamora, Bethesda, Md.

[73] Assignee: International Business Machines Corporation, Armonk, N.Y.

[21] Appl. No.: 25,464

[22] Filed: Mar. 3, 1993

[51] Int. Cl.⁶ .............................................. G06F 17/22
[52] U.S. Cl. ............................ 364/419.1; 364/419.17; 400/110
[58] Field of Search ...................... 364/419.1, 200 MS; 400/110

[56] References Cited

U.S. PATENT DOCUMENTS

| | | | |
|---|---|---|---|
| 4,327,421 | 4/1982 | Wang | 364/419.09 |
| 4,365,235 | 12/1982 | Greanias et al. | 382/13 |
| 4,484,305 | 11/1984 | Ho | 364/419.09 |
| 4,583,951 | 4/1986 | Soo | 434/178 |
| 4,669,901 | 6/1987 | Feng | 400/484 |
| 4,679,951 | 7/1987 | King et al. | 400/110 |
| 4,742,516 | 5/1988 | Yamaguchi | 370/94.1 |
| 4,750,122 | 6/1988 | Kaji et al. | 364/419.13 |
| 4,777,600 | 10/1988 | Saito et al. | 364/419.02 |
| 4,866,670 | 9/1989 | Adachi et al. | 364/499.05 |
| 4,937,745 | 6/1990 | Carmon | 364/419.09 |
| 5,079,702 | 1/1992 | Ho | 364/419.09 |
| 5,109,509 | 4/1992 | Katayama et al. | 395/600 |
| 5,161,245 | 11/1992 | Fenwick | 382/40 |

OTHER PUBLICATIONS

J. P. Roth, "Regular Language Transcription Machine," IBM Technical Disclosure Bulletin, Jun. 1982, pp. 185–189.

R. H. Wu, "Chinese Sound Encoding System on the IBM Personal Computer," IBM Technical Disclosure Bulletin, Sep. 1987, pp. 403–405.

IBM Technical Disclosure Bulletin, "Automatic Katakana Word Detection With Kana N–Gram," Sep. 1989, pp. 403–405.

S. Katoh, "Multi–Font Recognition Method Using a Layered Template Dictionary," IBM Technical Disclosure Bulletin, Feb. 1992, pp. 256–260.

*Primary Examiner*—Gail O. Hayes
*Assistant Examiner*—Frantzy Poinvil
*Attorney, Agent, or Firm*—Edward H. Duffield; John E. Hoel

[57] ABSTRACT

A process is described for mechanically analyzing connected Chinese text and isolating the words comprising the text. The process uses a dictionary, straightforward rules dealing with punctuation, a method for identifying all words in a string of Chinese text and resolving overlapping words into a set of adjacent words for the input text through successively stricter filtering mechanisms that eliminate illogical segmentations, and a method for resolving ambiguities.

6 Claims, 7 Drawing Sheets

FIG. 1

Data structure after dictionary lookup process.

<softwaredevelopment>

| Flag | Position | Length | Word |
|---|---|---|---|
| 0 | 0 | 2 | <so> |
| 0 | 0 | 4 | <soft> |
| 0 | 0 | 8 | <software> |
| 0 | 1 | 2 | <of> |
| 0 | 1 | 3 | <oft> |
| 0 | 4 | 3 | <war> |
| 0 | 4 | 4 | <ware> |
| 0 | 5 | 1 | <a> |
| 0 | 5 | 3 | <are> |
| 0 | 6 | 2 | <re> |
| 0 | 6 | 3 | <red> |
| 0 | 6 | 9 | <redevelop> |
| 0 | 6 | 13 | <redevelopment> |
| 0 | 8 | 7 | <develop> |
| 0 | 8 | 11 | <development> |
| 0 | 9 | 3 | <eve> |
| 0 | 12 | 3 | <lop> |
| 0 | 15 | 2 | <me> |
| 0 | 15 | 3 | <men> |

FIG. 2

Data structure after First Adjacency Process.

<softwaredevelopment>

| Flag | Position | Length | Word |
|------|----------|--------|------|
| 1 | 0 | 2 | <so> |
| 0 | 0 | 4 | <soft> |
| 0 | 0 | 8 | <software> |
| 1 | 1 | 2 | <of> |
| 2 | 1 | 3 | <oft> |
| 1 | 4 | 3 | <war> |
| 0 | 4 | 4 | <ware> |
| 2 | 5 | 1 | <a> |
| 2 | 5 | 3 | <are> |
| 0 | 6 | 2 | <re> |
| 0 | 6 | 3 | <red> |
| 0 | 6 | 9 | <redevelop> |
| 0 | 6 | 13 | <redevelopment> |
| 0 | 8 | 7 | <develop> |
| 0 | 8 | 11 | <development> |
| 0 | 9 | 3 | <eve> |
| 0 | 12 | 3 | <lop> |
| 1 | 15 | 2 | <me> |
| 1 | 15 | 3 | <men> |

FIG. 3

Data structure after Second Adjacency Process.

```
           <softwaredevelopment>

Flag    Position    Length    Word
 1         0          2       <so>
 0         0          4       <soft>
 0         0          8       <software>
 1         1          2       <of>
 2         1          3       <oft>
 1         4          3       <war>
 0         4          4       <ware>
 2         5          1       <a>
 2         5          3       <are>
 4         6          2       <re>
 4         6          3       <red>
 3         6          9       <redevelop>
 4         6         13       <redevelopment>
 3         8          7       <develop>
 0         8         11       <development>
 4         9          3       <eve>
 3        12          3       <lop>
 1        15          2       <me>
 1        15          3       <men>
```

FIG. 4

Non-deleted words after Second Adjacency Process.

```
           <softwaredevelopment>

Flag    Position    Length    Word
 0         0          4       <soft>
 0         0          8       <software>
 0         4          4       <ware>
 0         8         11       <development>
```

FIG. 6

```
Enter string to be processed

<在舉行的第一天會議中，>

Isolated:
loc: 0,  len: 2, <在>
loc: 2,  len: 2, <舉>
loc: 2,  len: 4, <舉行>
loc: 4,  len: 2, <行>
loc: 6,  len: 2, <的>
loc: 8,  len: 4, <第一>
loc: 12, len: 2, <天>
loc: 14, len: 4, <會議>
loc: 18, len: 2, <中>
loc: 20, len: 2, <，>

Enter string to be processed

<誠摯地促請美方一本以往合作的精神，>

Isolated:
loc: 0,  len: 2, <誠>
loc: 2,  len: 2, <摯>
loc: 4,  len: 2, <地>
loc: 6,  len: 2, <促>
loc: 8,  len: 2, <請>
loc: 10, len: 2, <美>
loc: 12, len: 2, <方>
loc: 14, len: 2, <一>
loc: 16, len: 2, <本>
loc: 18, len: 2, <以>
loc: 18, len: 4, <以往>
loc: 20, len: 2, <往>
loc: 22, len: 2, <合>
loc: 22, len: 4, <合作>
loc: 24, len: 2, <作>
loc: 26, len: 2, <的>
loc: 28, len: 4, <精神>
loc: 32, len: 2, <，>
```

FIG. 7

```
Enter string to be processed

<據中華社二十六日華盛頓電，>

Isolated:
loc: 0, len: 2, <據>
loc: 2, len: 4, <中華>
loc: 6, len: 2, <社>
loc: 8, len: 6, <二十六>
loc: 14, len: 2, <日>
loc: 16, len: 6, <華盛頓>
loc: 22, len: 2, <電>
loc: 24, len: 2, <,>

Enter string to be processed

<專程來美參加中美保護智慧財產權問題諮商的國府代表團，>

Isolated:
loc: 0, len: 2, <專>
loc: 2, len: 2, <程>
loc: 4, len: 2, <來>
loc: 6, len: 2, <美>
loc: 8, len: 4, <參加>
loc: 12, len: 2, <中>
loc: 12, len: 4, <中美>
loc: 14, len: 2, <美>
loc: 16, len: 4, <保護>
loc: 20, len: 4, <智慧>
loc: 24, len: 4, <財產>
loc: 24, len: 6, <財產權>
loc: 28, len: 2, <權>
loc: 30, len: 4, <問題>
loc: 34, len: 2, <諮>
loc: 36, len: 2, <商>
loc: 38, len: 2, <的>
loc: 40, len: 2, <國>
loc: 42, len: 2, <府>
loc: 44, len: 2, <代>
loc: 44, len: 4, <代表>
loc: 44, len: 6, <代表團>
loc: 46, len: 2, <表>
loc: 48, len: 2, <團>
loc: 50, len: 2, <,>
```

FIG. 8

```
Enter string to be processed

<共同設法解決有關智慧財產權問題，>

Isolated:
loc: 0,  len: 4, <共同>
loc: 4,  len: 2, <設>
loc: 6,  len: 2, <法>
loc: 8,  len: 4, <解決>
loc: 12, len: 2, <有>
loc: 12, len: 4, <有關>
loc: 14, len: 2, <關>
loc: 16, len: 4, <智慧>
loc: 20, len: 4, <財產>
loc: 20, len: 6, <財產權>
loc: 24, len: 2, <權>
loc: 26, len: 4, <問題>
loc: 30, len: 2, <，>

Enter string to be processed

<並將國府從美方的優先國家名單中除名。>

Isolated:
loc: 0,  len: 2, <並>
loc: 2,  len: 2, <將>
loc: 4,  len: 2, <國>
loc: 6,  len: 2, <府>
loc: 8,  len: 2, <從>
loc: 10, len: 2, <美>
loc: 12, len: 2, <方>
loc: 14, len: 2, <的>
loc: 16, len: 4, <優先>
loc: 20, len: 2, <國>
loc: 20, len: 4, <國家>
loc: 22, len: 2, <家>
loc: 24, len: 4, <名單>
loc: 28, len: 2, <中>
loc: 30, len: 4, <除名>
loc: 34, len: 2, <。>
```

METHOD FOR ISOLATION OF CHINESE WORDS FROM CONNECTED CHINESE TEXT

BACKGROUND OF THE INVENTION

1. Technical Field

The invention disclosed broadly relates to data processing systems and methods and more particularly relates to a linguistics method for isolation of Chinese words from connected Chinese text.

2. Background Art

The Chinese language is written as "logographs" each of which represents one syllable and usually a concept or meaningful unit. Chinese is traditionally written without spaces between these logographs. A Chinese "word" may consist of one or more of these logographs, and a reader of Chinese must identify the boundaries of these words to make sense of the text.

Chinese documents in electronic form are also written without spaces and this makes it difficult for computer applications such as Information Storage and Retrieval (IS/R) to identify terms for use in a mechanized index. Of course, the problem for IS/R can be solved by the brute-force approach of indexing every character of the text to make it possible to look for every combination of characters, but this is very inefficient because it uses too much index space and retrieves a lot of irrelevant results (low precision).

While the IS/R application can be solved without having to identify the words of Chinese text, there are other applications such as computer-assisted translation that require accurate identification of the words in order to provide a meaningful translation. It is the object of this invention to define a process for identifying all the words in a Chinese text string, to resolve overlapping words into a set of adjacent words through successively stricter filtering mechanisms that eliminate illogical segmentations, to resolve ambiguities by the use of frequency criteria and grammatical constraints.

OBJECTS OF THE INVENTION

It is therefore an object of the invention to provide a method for isolation of Chinese words from connected Chinese text.

SUMMARY OF THE INVENTION

These and other objects, features and advantages are accomplished by the invention. A process is described for mechanically analyzing connected Chinese text and isolating the words comprising the text. The process uses a dictionary, straightforward rules dealing with punctuation, a method for identifying all words in a string of Chinese text and resolving overlapping words into a set of adjacent words for the input text through successively stricter filtering mechanisms that eliminate illogical segmentations, and a method for resolving ambiguities.

BRIEF DESCRIPTION OF THE DRAWINGS

These and other objects, features and advantages will be more fully appreciated with reference to the accompanying figures.

FIG. 1 illustrates the data structure after a dictionary lookup process.

FIG. 2 illustrates the data structure after a first adjacency process.

FIG. 3 illustrates the data structure after a second adjacency process.

FIG. 4 illustrates non-deleted words after a second adjacency process.

FIG. 6 shows a first example of a string to be processed.

FIG. 7 shows a second example of a string to be processed.

FIG. 8 shows a third example of a string to be processed.

DISCUSSION OF THE PREFERRED EMBODIMENT

Figure 5:
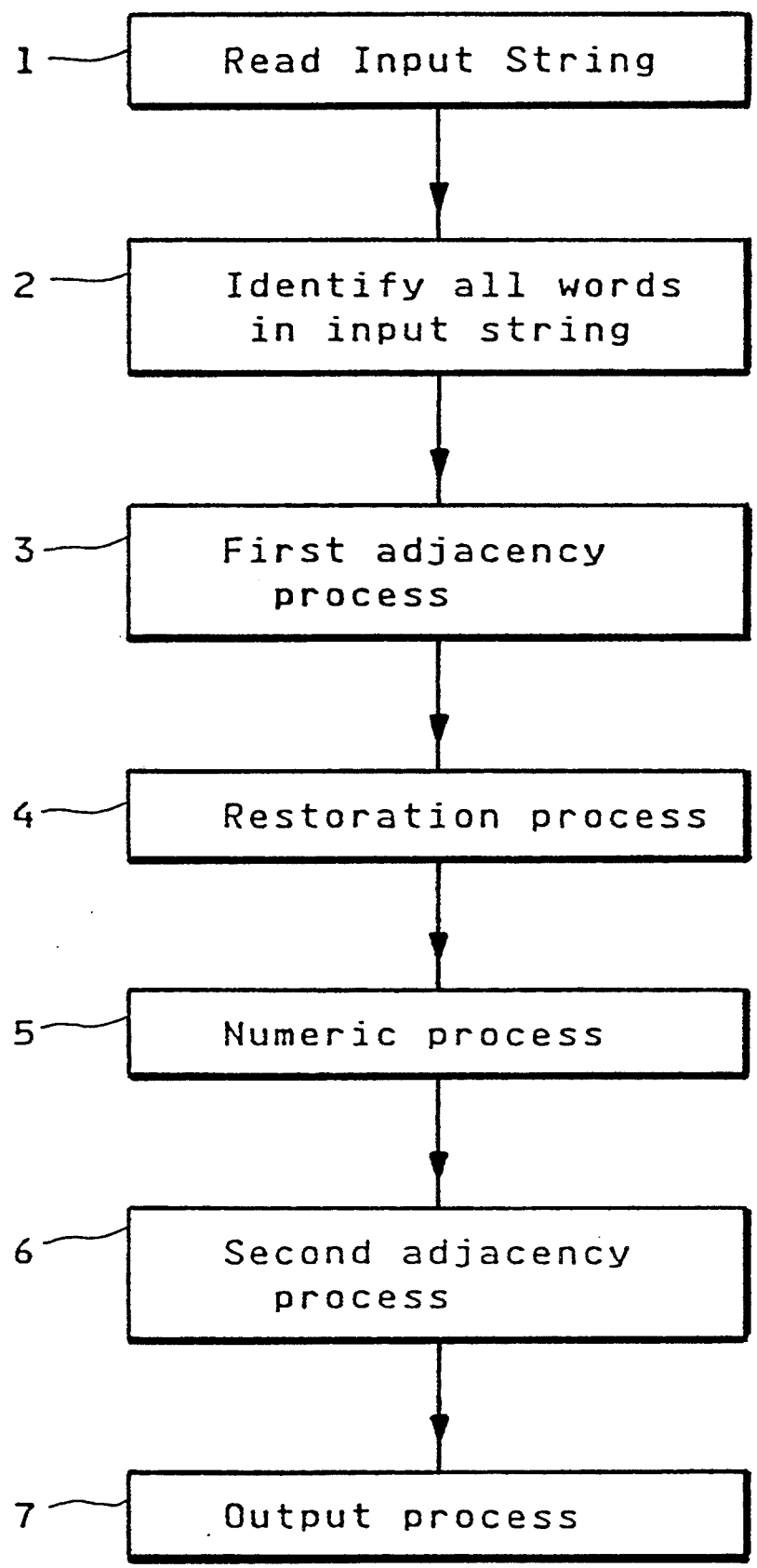
FIG. 5 illustrates a flow diagram of a sequence of operational steps for carrying out the method of the invention.

The process for isolating words from a text string requires a data structure that can identify substrings of the text consisting of adjacent characters. These substrings may represent Chinese words that overlap each other or are adjacent to each other. In addition, the data structure should be able to hold data that can be associated with each word, such as part of speech or frequency.

As an illustration of the embodiment of the invention, the data structure is represented by an array of at least three fields: position, length and flag. The position indicates the location of the first character of a string and the length specifies how long the string is. The flag is used to mark word entries as "deleted" and provides a mechanism for restoring deleted words. Additional fields to hold frequency information or part of speech may be added to the data structure to resolve various ambiguities.

FIG. 1 illustrates the contents of the data structure for the string "softwaredevelopment" after the identification of all words by use of dictionary lookup. Although the example is in English, an analogous process applies to Chinese text strings. Examination of the words in the data structure reveals words that are not immediately found by human reader, but which are unfailingly found by a computer when all possible substrings of the text are checked against a dictionary. A flag value of zero indicates that the word is not deleted. Notice that the position of the characters starts from zero rather than from one.

The Dictionary Lookup Process consists of identifying all substrings of the text and matching against the dictionary. However, to make the process more efficient and to guard against deficiencies in the coverage of the dictionary, the following criteria are used: 1) no substring containing a punctuation character is generated, and 2) when a character of the text is not encompassed by any word found in the dictionary, a data structure entry for the individual character is made.

Application of Adjacency Restrictions

The First Adjacency Process sets the flag of a word to a non-zero value to delete words that are not adjacent to another word or the beginning or end of the string. FIG. 2 shows a flag of 1 to mark words that do not end adjacent to the beginning of another word and a flag of 2 to mark words that do not start adjacent to a preceding word. Thus, the word "so" is marked as deleted because there is no word following it starting with "ft . . . " and the word "oft" is deleted because the preceding "s" is not a valid word. Notice that the First Adjacency Process eliminates eight of the 19 words from the list.

Problem With Overlapped Strings and Adjacency Restrictions

While the First Adjacency Process reduces the number of words substantially, it has a deficiency that has to be corrected by a First Restoration Process. Consider the string "thexresult," for example. After identifying the words "the," "hex," "re," and "result," the First Adjacency Process deletes the word "the" because it does not end adjacent to the beginning of another word and "hex" is deleted because it does not begin adjacent to the ending of another word. The word "re" is deleted because it does not end adjacent to the beginning of another word and only the word "result" remains because it is between the end of the word "hex" and the end of the string. This creates a gap in the coverage of the text string by the data structure. All word entries to the characters "thex" are deleted by the First Adjacency Process because the strings "the" and "hex" overlap.

Process for Creating Adjacent Strings From Overlapped Strings

The First Restoration Process identifies gaps in the coverage of the text string by the data structure by copying the text string and erasing all characters that are referenced. Any remaining characters are caused by overlap of text strings. The First Restoration Process selects the first unreferenced character and restores the longest word that contains it as the first character of the word by setting the flag back to zero. If the character does not occur as the first character of any deleted word, a new data structure entry is made for the single character. The characters from the restored word or the new entry are erased from the copy of the text string, and the process of selecting unreferenced characters is repeated until all characters are referenced.

At the conclusion of the First Restoration Process the data structure contains a set of non-overlapped entries that span the complete text string. Thus, the string "thexresult" is restored to "the," "x," and "result." The process could be applied to give preference to the final string for the alternative "t," "hex," and "result."

Additional Adjacency Restrictions

Following application of the First Adjacency Process and the First Restoration Process, it is possible to eliminate additional entries from the data structure by a Second Adjacency Process. The Second Adjacency Process deletes words that are not adjacent to another non-deleted word or the beginning or end of the string. FIG. 3 shows a flag of 3 to mark words that do not end adjacent to the beginning of another non-deleted word and a flag of 4 to mark words that do not start adjacent to a preceding non-deleted word.

The First Adjacency Process helps to establish word boundaries and the Second Advisory Process enforces a stricter logical consistency.

Numeric String Processing

Chinese text contains a variety of numeric strings that need to be handled as a unit and which cannot be expected to be in a dictionary since there is no limit the number of digit combinations that can be encountered. The Numeric Process identifies all strings consisting exclusively of numeric logographs and creates a single data structure entry that encompasses any adjacent numeric strings.

Resolution of Ambiguities

FIG. 4 shows that after the Second Adjacency Process some ambiguities remain. Should it be "soft" and "ware," or "software"? This is where additional dictionary data can be used to make a resolution. Frequency information could be used to gauge the likelihood that it is two words versus one word. For some applications, such as IR/S, it may even be desirable to index on all three words. The data structure makes it possible to preserve or resolve the ambiguities.

The following are the steps which are carried in the flow diagram of FIG. 5, which is the sequence of operational steps for carrying out the method of the invention.

Step 1. A character string is input from an input device and stored in an internal computer memory.

Step 2. The stored string in internal memory is scanned character-by-character. A data structure is created containing the location and length of every substring that can be found in a dictionary. Each such entry in the data structure is called a "word" and is associated with a status indicator that makes it possible to logically delete the word or restore a deleted word.

Step 3. The First Adjacency Process deletes any word which has no predecessors or successors. That is, a word is marked as deleted when it is not at the beginning of the string or is not preceded by a non-deleted word and if it is not at the end of the string or is not followed by a non-deleted word. The procedure is iterative. It is repeated until no more words can be deleted.

Step 4. The Restoration Process identifies portions of the input string that are not covered by non-deleted words in the data structure. Identification can be achieved by creating a copy of the input string and removing from the copy any characters belonging to non-deleted words in the data structure. The restoration process then proceeds to restore deleted words for any remaining characters in the copy of the string. When a character in the copy of the string cannot be covered by restoring a deleted word, a new data structure entry is made for the single character. As each word is restored or a new data structure entry is made, the corresponding characters in the copy of the string are removed. The process is repeated until all the characters in the copy of the string have been removed. At this point, all the characters of the input string are covered by at least one data structure entry.

Step 5. The Numeric Process integrates adjacent numeric characters into a single data structure entry. The data structure is scanned for data structure entries consisting exclusively of numeric characters. When several such adjacent entries are found, all of them are deleted and the first one is restored, but with a length that encompasses all the adjacent numeric characters.

Step 6. This adjacency step is equivalent to Step 3. It guarantees that there are no words without predecessors or successors after manipulation of the data structure.

Step 7. The output process is the selection of data structure entries for output to a printing device, to an indexing process, or to a data base process. The output process may make use of statistical information in selecting the entries in the data structure. For example, since two-character Chinese words occur more frequently than one-character words or words of there or more characters, the output process may give preference to two-character words when there is a choice in the data structure. Such a choice may be preferred for printing information. However, for indexing information in a data base, it may be advantageous to index on all words in the data structure to maximize retrieval.

FIG. 6, parts A and B show two examples of strings to be processed. FIG. 7, parts A and B shows additional examples of strings to be processed. FIG. 8 shows still further examples of strings to be processed in FIG. 8, parts A and B. FIGS. 6, 7 and 8 illustrate the operation of the invention and the results achieved. The resulting invention provides an improved method for isolating Chinese words from connected Chinese text.

Although a specific embodiment of the invention has been disclosed, it will be understood by those having skill in the art that changes in that specific embodiment can be made without departing from the spirit and the scope of the invention.

What is claimed is:

1. In a data processing system, a method for isolating words from connected text, comprising the steps of:
   reading an input string of text into a data processing system;
   identifying in the system all words in the input string;
   performing in the system a First Adjacency Process to delete words that are not adjacent to another word;
   performing in the system a Restoration Process to restore a longest word containing an unreferenced character deleted by said First Adjacency Process forming a sequence of isolated words;
   outputting the sequence of isolated words with indicated separations.

2. In a computer system with input and output, a method of using a data structure to identify words from input text, comprising:
   matching all substrings of the input text which are stored as words in a reference dictionary;
   flagging any characters that are not encompassed by the dictionary word as single-character words;
   identifying overlapped words and eliminating words that are not connected to adjacent words by scanning every entry in the data structure; and
   flagging an entry as deleted if it does not represent a word that is at the beginning of the input text or preceded by another word at the end of the input text or followed by another word.

3. The method of claim 2, which further comprises:
   resolving overlapped words into adjacent words by an iterative process of identifying all characters that are not included in non-deleted words and for each such character restoring a deleted word that contains the character.

4. The method of claim 3, which further comprises:
   consolidating numeric strings by the identification of adjacent all-numeric strings and creation of a data structure entry for consecutive all-numeric strings.

5. The method of claim 3, which further comprises:
   eliminating words that are not connected to adjacent words by scanning every entry in the data structure and flagging the word as deleted if it does not represent a word that is at the beginning of the input text or preceded by another non-deleted word and at the end of the input text or followed by another non-deleted word.

6. The method of claim 5, which further comprises:
   identifying the location and scope of ambiguities by an iterative process of scanning the data structure to find multiple entries referring to the same location of the input text string, creating an output data structure corresponding to each alternate string in the data structure, and recursively attaching adjacent words to the smaller string, until all strings are of equal length.

* * * * *